United States Patent
Ishizaki et al.

(10) Patent No.: US 11,235,607 B2
(45) Date of Patent: Feb. 1, 2022

(54) ABNORMALITY DETECTING DEVICE, ABNORMALITY DETECTING METHOD, COMPUTER PROGRAM PRODUCT, AND IMAGE FORMING DEVICE

(71) Applicants: Yusuke Ishizaki, Kanagawa (JP); Takaaki Kaneko, Kanagawa (JP)

(72) Inventors: Yusuke Ishizaki, Kanagawa (JP); Takaaki Kaneko, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/934,238

(22) Filed: Jul. 21, 2020

(65) Prior Publication Data

US 2021/0031548 A1    Feb. 4, 2021

(30) Foreign Application Priority Data

Jul. 31, 2019 (JP) .............................. JP2019-141774
Jun. 22, 2020 (JP) .............................. JP2020-107283

(51) Int. Cl.
  *B41J 29/393*    (2006.01)
  *G01B 11/06*    (2006.01)
  *B41J 11/00*    (2006.01)

(52) U.S. Cl.
  CPC ......... *B41J 29/393* (2013.01); *B41J 11/0095* (2013.01); *G01B 11/0608* (2013.01); *B41J 2203/011* (2020.08)

(58) Field of Classification Search
  CPC ................. B41J 29/393; B41J 11/0095; B41J 2203/011; G01B 11/0608
  See application file for complete search history.

(56) References Cited

U.S. PATENT DOCUMENTS 9,832,324 B2    11/2017   Ishizaki et al.
2016/0155029 A1*    6/2016   Van Acquoij ...... H04N 1/00716
                                                358/1.12

(Continued)

FOREIGN PATENT DOCUMENTS

JP   2012-192673   10/2012
JP   2015-009545   1/2015

(Continued)

*Primary Examiner* — Julian D Huffman
(74) *Attorney, Agent, or Firm* — Harness, Dickey & Pierce, P.L.C.

(57) ABSTRACT

An abnormality detecting device includes: a light emitter including a light-emitting element disposed at one side of a conveyed medium, and configured to emit a laser beam having a width in a thickness direction of the medium by the light-emitting element; a light receiver disposed at the other side of the medium to be opposed to the light emitter across the medium, including a plurality of light-receiving elements arranged in the thickness direction of the medium, and configured to receive, by the plurality of light-receiving elements, the laser beam emitted by the light emitter; and a detecting unit configured to detect a lift of the medium in a case where a number of light-receiving elements indicating received light amounts not exceeding a first threshold and being arranged successively in the thickness direction among the plurality of light-receiving elements exceeds a second threshold.

8 Claims, 10 Drawing Sheets

(56) References Cited

U.S. PATENT DOCUMENTS

| | | | |
|---|---|---|---|
| 2016/0159117 A1* | 6/2016 | Gurak | G01B 11/02 |
| | | | 347/16 |
| 2016/0167410 A1 | 6/2016 | Takada | |
| 2019/0241385 A1 | 8/2019 | Kaneko et al. | |

FOREIGN PATENT DOCUMENTS

| | | |
|---|---|---|
| JP | 2016-175737 | 10/2016 |
| JP | 2017-083311 | 5/2017 |
| JP | 2019-136910 | 8/2019 |
| JP | 2020-085745 | 6/2020 |

* cited by examiner

ABNORMALITY DETECTING DEVICE, ABNORMALITY DETECTING METHOD, COMPUTER PROGRAM PRODUCT, AND IMAGE FORMING DEVICE

CROSS-REFERENCE TO RELATED APPLICATIONS

The present application claims priority under 35 U.S.C. § 119 to Japanese Patent Application No. 2019-141774, filed on Jul. 31, 2019 and Japanese Patent Application No. 2020-107283, filed on Jun. 22, 2020. The contents of which are incorporated herein by reference in their entirety.

BACKGROUND OF THE INVENTION

1. Field of the Invention

The present invention relates to an abnormality detecting device, an abnormality detecting method, a computer program product, and an image forming device.

2. Description of the Related Art

In commercial printers of an inkjet type, the distance between an inkjet and a sheet of paper (recording medium) needs to be set to a short distance of about 1 millimeter in order to achieve high image quality. However, by this configuration, even if a slight lift of the sheet of paper has occurred, head attack may be caused in which the sheet of paper comes into contact with the inkjet head to damage the inkjet head.

For example, Japanese Unexamined Patent Application Publication No. 2015-9545 discloses a technique in which, in order to prevent such head attack, an optical sensor pair (medium lift sensor) of a light emitter configured to emit a laser beam and a light receiver configured to receive the emitted laser beam is disposed upstream of the inkjet head, the amount of light received by the light receiver is detected while a conveyed medium is passing, and it is recognized that a lift of the medium has occurred when the amount of received light has become smaller than a threshold.

However, in the technique of Japanese Unexamined Patent Application Publication No. 2015-9545, there is the problem that erroneous detection of a medium lift may occur due to interference caused by reflection of the laser beam on a medium, for example.

SUMMARY OF THE INVENTION

According to an aspect of the present invention, an abnormality detecting device includes a light emitter, a light receiver, and a detecting unit. The light emitter includes a light-emitting element disposed at one side of a conveyed medium, and configured to emit a laser beam having a width in a thickness direction of the medium by the light-emitting element. The light receiver is disposed at the other side of the medium to be opposed to the light emitter across the medium, includes a plurality of light-receiving elements arranged in the thickness direction of the medium, and is configured to receive, by the plurality of light-receiving elements, the laser beam emitted by the light emitter. The detecting unit configured to detect a lift of the medium in a case where a number of light-receiving elements indicating received light amounts not exceeding a first threshold and being arranged successively in the thickness direction among the plurality of light-receiving elements exceeds a second threshold.

BRIEF DESCRIPTION OF THE DRAWINGS

FIG. A is a diagram schematically illustrating the abnormality detecting device.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an abnormality detecting device, an abnormality detecting method, a computer program product, and an image forming device that enable removal of erroneous detection of a medium lift that may occur due to interference caused by reflection of a laser beam on a medium, for example.

A preferred embodiment of an abnormality detecting device, an abnormality detecting method, and a computer program product according to the present invention will now be described in detail with reference to the attached drawings.

Configuration of Image Forming Device According to Embodiment

Figure 1:
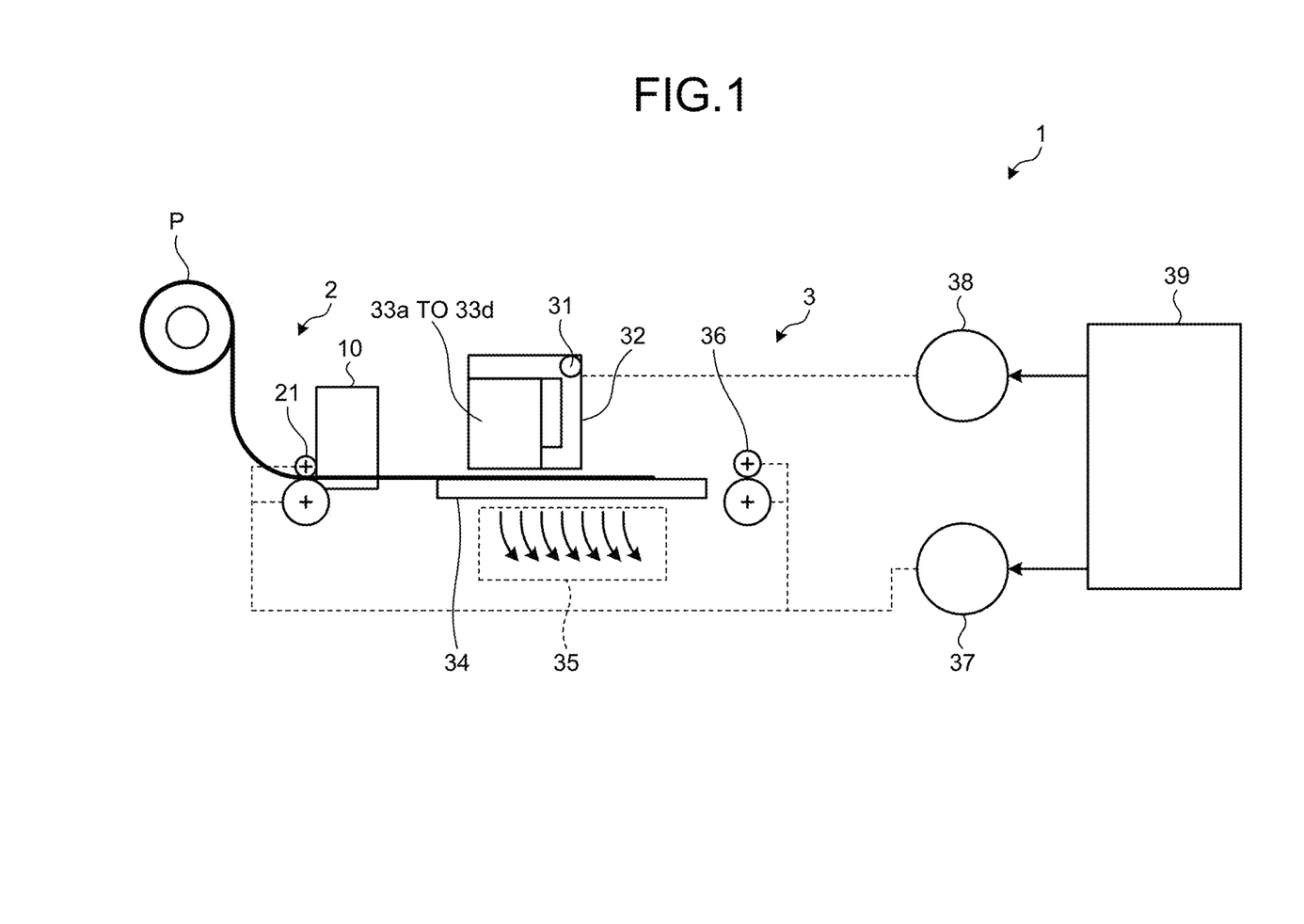
FIG. 1 is a diagram illustrating a schematic configuration of an image forming device.

FIG. 1 is a diagram schematically illustrating main components of an image forming device 1 to which one embodiment of an abnormality detecting device, an abnormality detecting method, a computer program product, and an image forming device is applied.

In FIG. 1, the image forming device 1 includes a medium supply unit 2, an image recording unit 3, and an abnormality detecting device 10. The medium supply unit 2 conveys a medium P having a predetermined width to the image recording unit 3 by a conveying roller 21. In other words, the conveying roller 21 (one example of a "conveying unit") conveys the medium P in a sub-scanning direction in which the medium P is conveyed, and delivers it to the image recording unit 3 (one example of an "image forming unit").

The image recording unit 3 forms an image on the medium P. The image recording unit 3 includes a carriage 32. The carriage 32 is movably attached to a guide rod 31. The guide rod 31 extends in a main-scanning direction (a direction perpendicular to the page of FIG. 1) so as to have a length longer than the predetermined width of the medium.

On the carriage 32, recording heads 33a to 33d for a plurality of predetermined colors (e.g., cyan (C), magenta (M), yellow (Y), black (K)) are mounted in a manner aligned in the main-scanning direction. The recording heads 33a to 33d eject inks onto the medium P delivered by the conveying roller 21 to form an image thereon. The image recording unit 3 may be of a type in which recording heads are aligned in a line.

Below the carriage 32, a plate-like platen 34 configured to support a medium P that has been supplied from the medium supply unit 2 and is to be conveyed is disposed. Below the platen 34, an air suction unit 35 is disposed, and air holes (not illustrated) are formed in the platen 34.

In the image recording unit 3, the air suction unit 35 suctions air through the air holes of the platen 34, and thus a medium P sent from the medium supply unit 2 is conveyed in the sub-scanning direction while being brought into close contact with the platen 34 without being bent. In the image recording unit 3, a conveying roller 36 is disposed downstream in the conveying direction of the medium P, and the conveying roller 21 of the medium supply unit 2 and the conveying roller 36 of the image recording unit 3 are driven to be rotated by a medium feeding motor 37 to convey the medium P.

A drive mechanism (not illustrated) is driven by a carriage motor 38, whereby the carriage 32 of the image recording unit 3 is moved along the guide rod 31 in the main-scanning direction.

A motor control unit 39 is configured such that driving is controlled by the medium feeding motor 37 and the carriage motor 38 and conveyance of the medium P and movement of the carriage 32 are accordingly controlled.

The abnormality detecting device 10 described later is disposed at a position closer to the medium supply unit 2 than to the recording heads 33a to 33d, and detects a lift of the medium P.

Herein, an example has been described in which the abnormality detecting device 10 is used in the image forming device 1 configured such that the conveying roller 21 horizontally conveys the medium P and the image recording unit 3 forms an image thereon. However, the abnormality detecting device 10 may be used in an image forming device configured such that a medium P is wound onto a conveying drum to be conveyed and an image forming unit forms an image thereon. In the following description, the conveying roller 21 can be read as a conveying drum.

Configuration of Abnormality Detecting Device According to Embodiment

Figure 2:
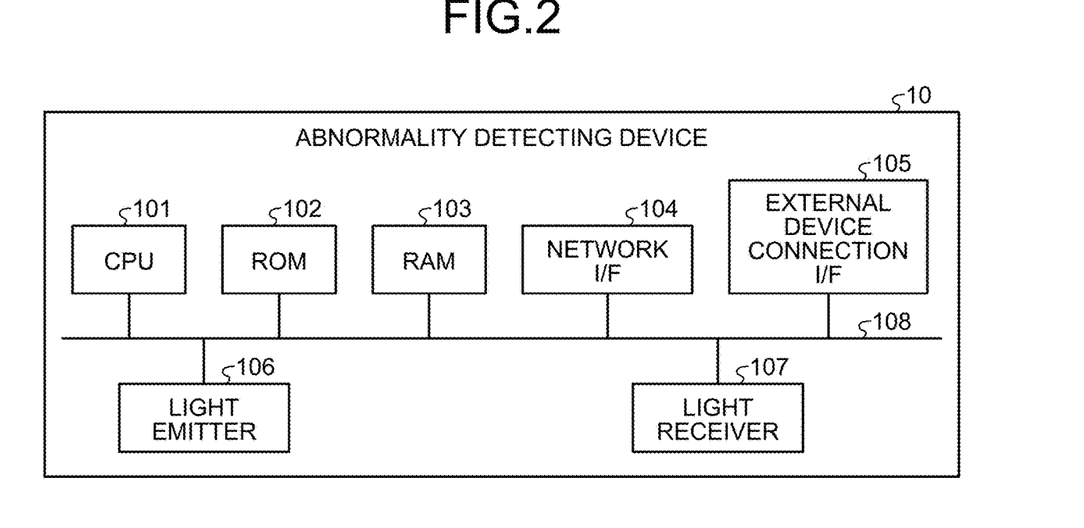
FIG. 2 is a block diagram illustrating one example of a hardware configuration of an abnormality detecting device.

The following describes a hardware configuration of the abnormality detecting device according to the present embodiment. FIG. 2 is a block diagram illustrating one example of the hardware configuration of the abnormality detecting device 10 according to the present embodiment.

The abnormality detecting device 10 according to the embodiment of the present invention includes a CPU 101, a ROM 102, a RAM 103, a network I/F 104, an external device connection I/F 105, a light emitter 106, a light receiver 107, and a bus line 108.

The CPU 101 controls operation of the entire abnormality detecting device 10. The ROM 102 stores therein a computer program to be used for driving the CPU 101. The RAM 103 is used as a work area for the CPU 101.

The network I/F 104 is an interface for data communication using a communication network such as the Internet. The external device connection I/F 105 is an interface for connecting various types of external device. The bus line 108 is an address bus, a data bus, and the like for electrically connecting the respective components such as the CPU 101 illustrated in FIG. 2.

The light emitter 106 includes a light emitting element disposed at one side of a conveyed medium P, and emits a detection beam L (one example of a "laser beam") having a width in a thickness direction of the medium P by the light-emitting element. The light-emitting element emits laser rays 1 parallel toward a plurality of light-receiving elements. The term "parallel" in the present embodiment is not limited to being parallel, and may mean being substantially parallel so that the same functional effect can be obtained.

It is noted that in the present embodiment, the light emitting element of the light emitter 106 includes a plurality of light emitting elements arranged in the thickness direction of the medium P, but the light emitting element may be a single light emitting element. In short, the number of light emitting elements may be any number as long as the light emitter 106 is configured to be capable of emitting the laser beam having the width in the thickness direction of the medium P The light receiver 107 is disposed at the other side of the medium P so as to be opposed to the light emitter 106 with the medium P interposed therebetween, includes the plurality of light-receiving elements arranged in the thickness direction of the medium P, and receives, by the plurality of light-receiving elements, the detection beam L emitted by the light emitter 106. As each light-receiving element, for example, a charge-coupled device (CCD) is used.

The plurality of light-receiving elements are provided so as to be opposed to the light-emitting elements with the medium P interposed therebetween in the width direction of the medium P. The plurality of light-receiving elements receive laser rays 1 emitted from the light-emitting elements. The light receiver 107 outputs the amount of light received by each of the plurality of light-receiving elements as a voltage value to the CPU 101.

In the present embodiment, as a signal value that the light receiver 107 outputs to the CPU 101, a voltage value is used. However, the present invention is not limited to this, and a current value or the like may be used.

Figure 3:
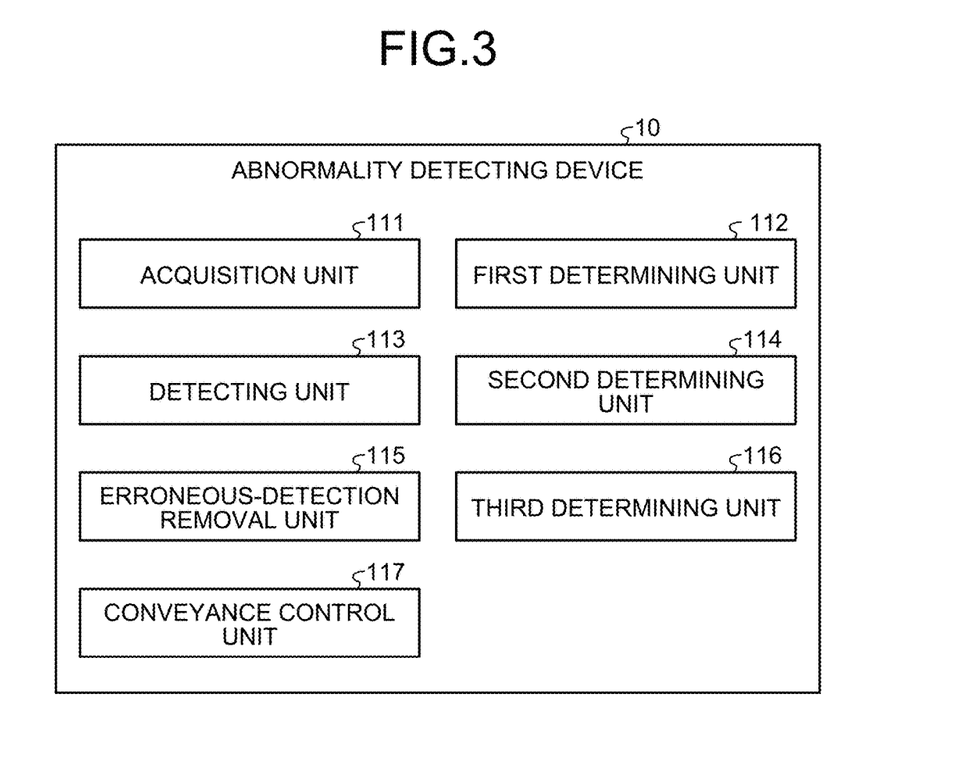
FIG. 3 is a block diagram illustrating one example of a functional configuration of the abnormality detecting device.

The following describes functions to be implemented by the abnormality detecting device 10. FIG. 3 is a block diagram illustrating an example of a functional configuration of the abnormality detecting device 10 according to the present embodiment.

The abnormality detecting device 10 according to the present embodiment includes an acquisition unit 111, a first determining unit 112, a detecting unit 113, a second determining unit 114, an erroneous-detection removal unit 115, a third determining unit 116, and a conveyance control unit 117.

The acquisition unit 111 is disposed in the thickness direction of the medium P to be conveyed, and acquires the light amount of a laser ray 1 received by each of the plurality of light-receiving elements that are opposed to the light-emitting elements configured to emit laser rays 1 parallel to the conveying surface of the medium P with the medium P interposed therebetween. In the present embodiment, the acquisition unit 111 acquires the received light amount of each light-receiving element output as a voltage value from the light receiver 107 to the CPU 101.

The first determining unit 112 determines whether laser rays 1 are blocked at the respective positions of the plurality of light-receiving elements. In the present embodiment, the first determining unit 112 determines whether each of the plurality of light-receiving elements indicates a received light amount not exceeding a first threshold described later. The first determining unit 112 determines that the position of a light-receiving element indicating a received light amount not exceeding the first threshold is blocked, and determines that blocking does not occur at the position of a light-receiving element indicating a received light amount exceeding the first threshold.

The detecting unit 113 detects a lift of the medium P when the number of, among the plurality of light-receiving elements, light-receiving elements that indicate received light amounts not exceeding the first threshold and are arranged successively in the thickness direction of the medium P exceeds a second threshold. In the present embodiment, in order to detect a lift of the medium P, the detecting unit 113 detects first a light-receiving element that indicates a received light amount not exceeding the first threshold and is at the highest position.

If a second determining unit 114 described later has determined that no medium is present, the detecting unit 113 detects a light-receiving element that is at the next highest position except a light-receiving element that an erroneous-detection removal unit 115 described later has excluded from targets to be detected by the detecting unit 113.

If the second determining unit 114 has determines that the medium P is present, the detecting unit 113 detects, as a lift of the medium P, the height of, among the plurality of light-receiving elements, a light-receiving element that indicates a received light amount not exceeding the first threshold and is at the highest position except the light-receiving element that the erroneous-detection removal unit 115 has excluded from the targets to be detected by the detecting unit 113.

The second determining unit 114 determines whether the medium P is present at the position of each light-receiving element. In the present embodiment, the second determining unit 114 determines whether the number of, among the plurality of light-receiving elements, light-receiving elements that indicate received light amounts not exceeding the first threshold and are arranged successively in the thickness direction of the medium P exceeds the second threshold described later. The second determining unit 114 determines that the medium P is present at the positions of the light-receiving elements if the number exceeds the second threshold, and determines that the medium P is not present at the positions of the light-receiving elements if the number does not exceed the second threshold.

In a case where the number of, among the plurality of light-receiving elements, light-receiving elements that indicate received light amounts not exceeding the first threshold and are arranged successively in the thickness direction of the medium P does not exceed the second threshold, the erroneous-detection removal unit 115 considers this case as erroneous detection and does not detect a lift of the medium P. In the present embodiment, the erroneous-detection removal unit 115 excludes a light-receiving element that is at the position where the second determining unit 114 has determined that no medium is present from the targets to be detected by the detecting unit 113.

The third determining unit 116 determines whether a lift of the medium P detected by the detecting unit 113 exceeds a third threshold. The third determining unit 116 determines that abnormality has occurred if the lift exceeds the third threshold, and determines that no abnormality has occurred if the lift does not exceed the third threshold.

The third threshold herein is a threshold for determining whether abnormality occurs. The third threshold is set to a value in consideration of, for example, properties of a medium P to be used so that head attack can be prevented and frequent stoppage of conveyance of the medium P can be prevented. The third threshold can be optionally changed depending on a medium P to be used, for example.

The conveyance control unit 117 controls conveyance of the medium P performed by the conveying rollers 21, 36 of the image forming device 1. If a lift of the medium P detected by the detecting unit 113 has exceeded the third threshold, the conveyance control unit 117 stops conveyance of the medium P. In the present embodiment, if the third determining unit 116 has determined that abnormality has occurred, the conveyance control unit 117 stops conveyance operation of the medium P performed by the conveying rollers 21, 36.

In the present embodiment, the respective functions of the acquisition unit 111, the first determining unit 112, the detecting unit 113, the second determining unit 114, the erroneous-detection removal unit 115, the third determining unit 116, and the conveyance control unit 117 described above are implemented when the CPU 101 executes the computer program stored in the ROM 102, for example.

Herein, the computer program to be executed in the abnormality detecting device 10 according to the present embodiment may be configured to be provided as an installable or executable file stored in a computer-readable recording medium such as a CD-ROM, a flexible disk (FD), a CD-R, or a digital versatile disc (DVD).

Furthermore, the computer program to be executed in the abnormality detecting device 10 according to the present embodiment may be configured to be provided in such a manner that the computer program is stored in a computer connected to a network such as the Internet and is downloaded via the network. The computer program to be executed in the abnormality detecting device 10 according to the present embodiment may be configured to be provided or distributed via a network such as the Internet.

The computer program to be executed in the abnormality detecting device 10 according to the present embodiment is configured as a module including the above-described components (the acquisition unit 111, the first determining unit 112, the detecting unit 113, the second determining unit 114, the erroneous-detection removal unit 115, the third determining unit 116, and the conveyance control unit 117 described above). As actual hardware thereof, the CPU 101 reads the computer program from the ROM 102, for example, to execute it, whereby the above-described respective components are loaded into the RAM 103, and the acquisition unit 111, the first determining unit 112, the detecting unit 113, the second determining unit 114, the erroneous-detection removal unit 115, the third determining unit 116, and the conveyance control unit 117 are generated in the RAM 103.

The respective functions of the embodiment described above can be implemented by one or a plurality of processing circuits. The term "processing circuits" herein includes devices such as a processor programmed to perform the respective functions by software like a processor implemented by an electronic circuit, and also an application specific integrated circuit (ASIC), a digital signal processor (DSP), a field programmable gate array (FPGA), and a conventional circuit module that are designed to perform the respective functions described above.

Operation of Abnormality Detecting Device According to Embodiment

Figure 4:
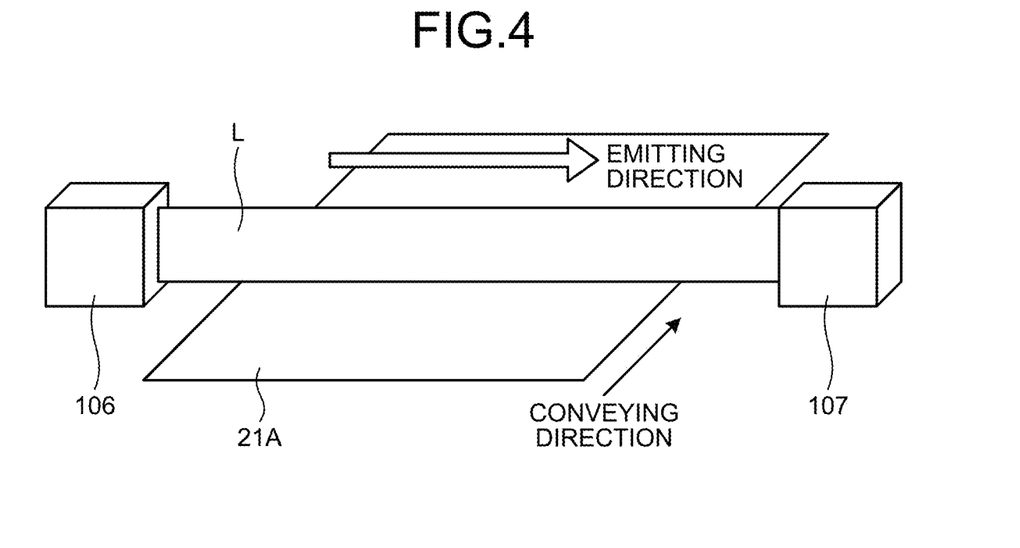

The following describes operation of the abnormality detecting device 10 according to the present embodiment. FIG. A is a diagram schematically illustrating the abnormality detecting device 10 according to the embodiment. The light emitter 106 emits a detection beam L parallel to the conveying surface 21A of the conveying roller 21 for the medium P toward the light receiver 107.

The light receiver 107 receives the detection beam L emitted from the light emitter 106. The light receiver 107 outputs the amount of received light as a voltage value to the CPU 101. The conveying roller 21 conveys the medium P (not illustrated in FIG. 4) such as a sheet of paper along a conveying path. The medium P is conveyed while being placed on the conveying surface 21A.

Figure 5:
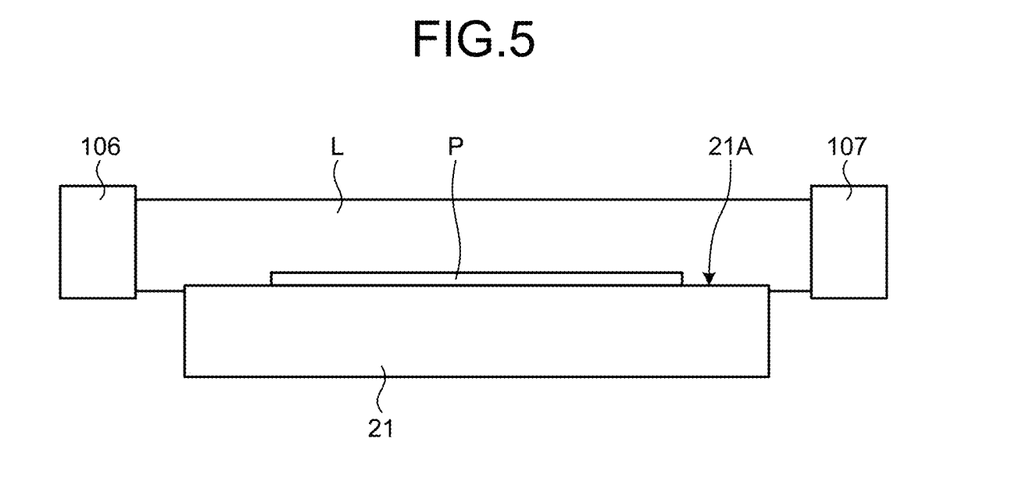
FIG. 5 is a front view illustrating one example of operation of detecting a lift of a medium in the abnormality detecting device.

FIG. 5 is a front view illustrating one example of operation of detecting a lift of the medium P in the abnormality detecting device 10 according to the present embodiment. The light emitter 106 includes a plurality of light-emitting elements arranged in the thickness direction of the medium P. The light emitter 106 emits, for example, laser rays 1 parallel to the conveying surface 21A. The bundle of the laser rays 1 emitted by the light-emitting elements corresponds to the detection beam L.

The light receiver 107 includes the plurality of light-receiving elements arranged in the thickness direction of the medium P. The light receiver 107 receives by the plurality of light-receiving elements the laser rays 1 emitted from the light-emitting elements, outputs a voltage value based on the amount of light thus received, and measures the height of an object that blocks a laser ray 1.

Herein, a principle of measuring the height of an object that blocks a laser ray 1 will be described briefly. To begin with, when a medium P is present between the light emitter 106 and the light receiver 107, a laser ray 1 is blocked by the medium P. When the laser ray 1 is blocked, the amount of light received by a light-receiving element that is at the blocked position (height) decreases. Because the plurality of light-receiving elements are arranged in the thickness direction of the medium P, the height of the object blocking the laser ray 1 can be measured based on the position of the light-receiving element with the received light amount having decreased.

The light receiver 107 detects abnormality due to a lift of the medium P when a recording medium being conveyed along the conveying path on the conveying surface 21A has lifted and the height of the corresponding object blocking a laser ray 1 has exceeded a threshold. In this case, the conveyance control unit 117 considers that abnormality has occurred and stops conveyance operation.

In FIG. 5, a case is illustrated in which the light emitter 106 and the light receiver 107 are disposed so as to be opposed each other. However, the light emitter 106 and the light receiver 107 do not have to be disposed so as to be opposed to each other. For example, the light emitter 106 and the light receiver 107 may be incorporated into one module and disposed in the same place. In this case, a reflecting plate is disposed at an opposed position, for example, to cause a path of the detection beam L to pass across the recording medium.

The following specifically describes a process of detecting a lift of the medium P in the abnormality detecting device 10 according to the present embodiment.

To begin with, the acquisition unit 111 acquires the received light amount of each of the plurality of light-receiving elements output as a voltage value from the light receiver 107. Subsequently, the first determining unit 112 determines whether the received light amount of each light-receiving element acquired by the acquisition unit 111 indicates a value not exceeding a first threshold. In other words, in order to determine whether a laser ray 1 is blocked, the first determining unit 112 binarizes the received light amount of each light-receiving element.

The first threshold herein is a threshold for detecting whether a laser ray 1 is blocked by the medium P. The first threshold is set to a value in consideration of, for example, properties of a medium P to be used. The first threshold can be optionally changed depending on a medium P to be used, for example.

Figure 6:
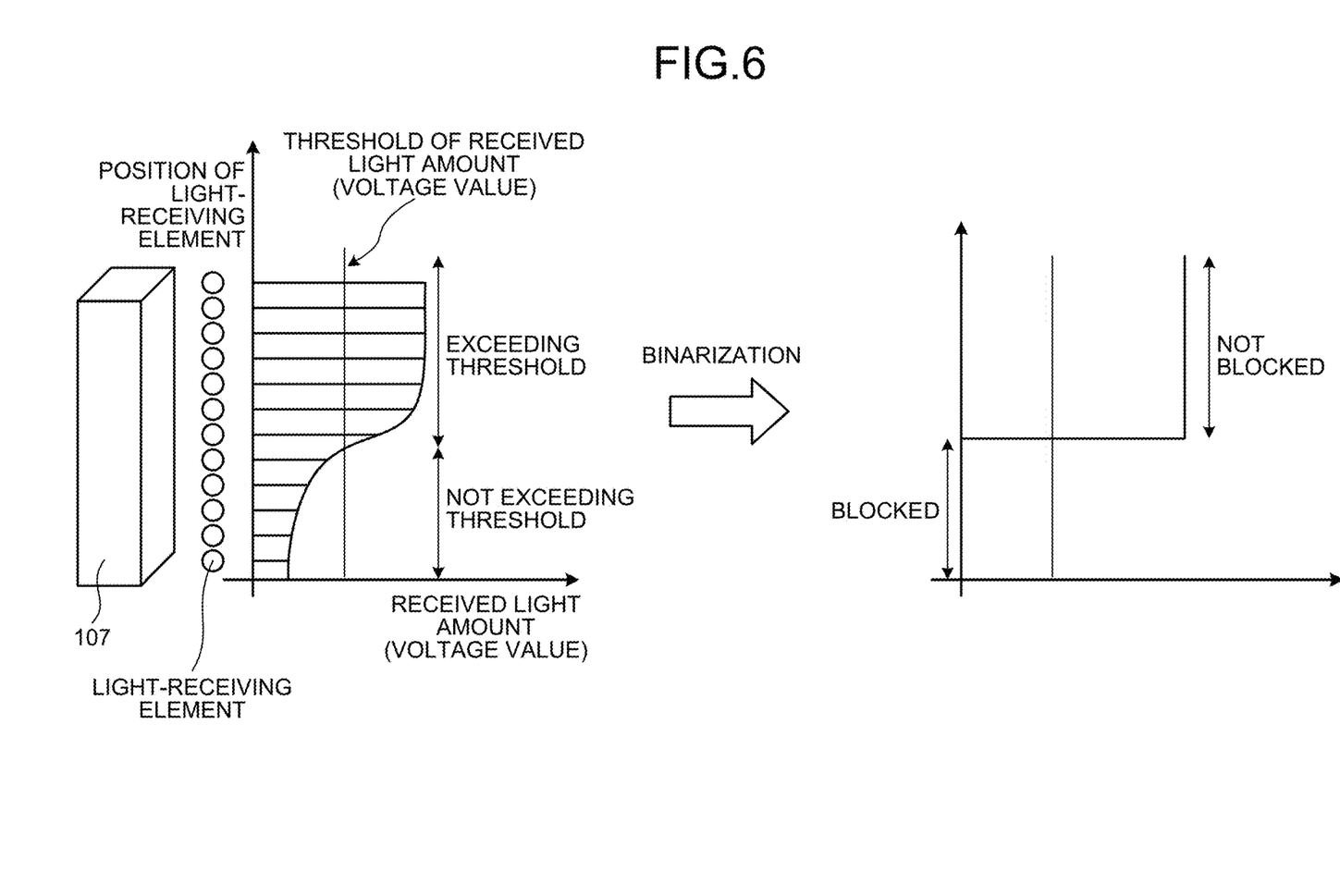
FIG. 6 is a diagram illustrating one example of a process of detecting a lift of a medium in the abnormality detecting device.

FIG. 6 is a diagram illustrating one example of a process of detecting a lift of a medium P in the abnormality detecting device 10 according to the present embodiment. As described above, the light receiver 107 includes the plurality of light-receiving elements in the thickness direction of the medium P. As illustrated in the left of FIG. 6, the first determining unit 112 divides all the plurality of light-receiving elements into two groups of a group of light-receiving elements indicating received light amounts not exceeding the first threshold and a group of light-receiving elements indicating received light amounts exceeding the first threshold.

As illustrated in the right of FIG. 6, the first determining unit 112 determines that laser rays 1 are blocked if the received light amounts do not exceed the first threshold, and determines that laser rays 1 are not blocked if the received light amounts exceed the first threshold. The detecting unit 113 detects a light-receiving element that is at the highest position in the group of light-receiving elements for which the first determining unit 112 has determined that blocking occurs. The detecting unit 113 basically detects the height of this light-receiving element as the height of the medium P.

As described above, the detecting unit 113 of the abnormality detecting device 10 according to the present embodiment is configured to basically detect, as the height of the medium P, the height of a light-receiving element that is at the highest position among light-receiving elements for which the first determining unit 112 has determined that blocking occurs. The reason for this will be described with reference to FIG. 7 and FIG. 8.

Figure 7:
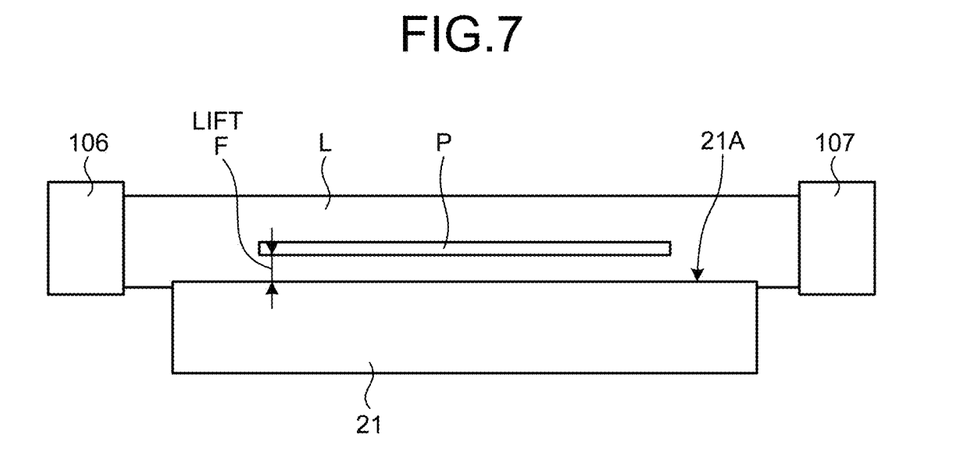
FIG. 7 is a front view illustrating one example of a state in which a medium has completely lifted in the abnormality detecting device.

FIG. 7 is a front view illustrating one example of a state in which a medium P has completely lifted. As illustrated in FIG. 7, when the medium P has completely lifted and a space (a lift F) has been formed between the medium P and the conveying roller 21, an area that is not blocked may be formed between the medium P and the conveying roller 21.

Figure 8:
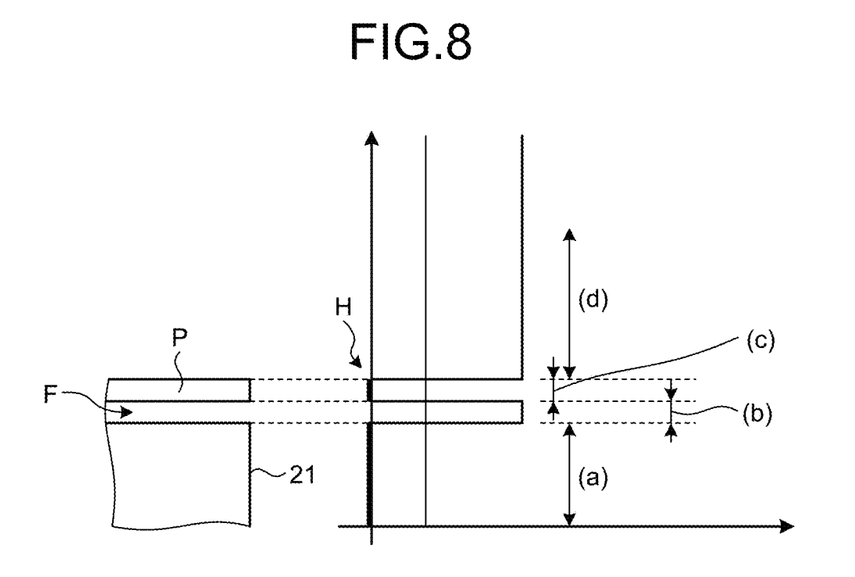
FIG. 8 is a diagram illustrating one example of a waveform output when the medium has completely lifted in the abnormality detecting device.

FIG. 8 is a diagram illustrating one example of a waveform output when the medium P has completely lifted. In the left of FIG. 8, a positional relation between the medium P and the conveying roller 21, for example, when the vicinity where the abnormality detecting device 10 of the image forming device 1 is disposed is observed from front.

As illustrated in FIG. 8, when a lift F of the medium P has occurred and an area (b) that is not blocked has been formed between the medium P and the conveying roller 21, if the highest position in an area (a) that is blocked by the conveying roller 21 is detected, as a lift of the medium P, the medium P and the heads may come into contact with each other thereby causing head attack because the medium P is actually present at a position higher than the area (a).

In this case, in order to prevent the head attack caused by the occurrence of a lift of the medium P, the highest position in the area (c) that is blocked by the medium P needs to be detected as a lift of the medium P. In view of this, the detecting unit 113 of the abnormality detecting device 10 according to the present embodiment is configured to basically detect, as a lift of the medium P, the height of a light-receiving element that is at the highest position H among light-receiving elements for which the first determining unit 112 has determined that blocking occurs.

In FIG. 8, (d) denotes an area that is at a position higher than the medium P and where laser rays 1 are not blocked.

Figure 9:
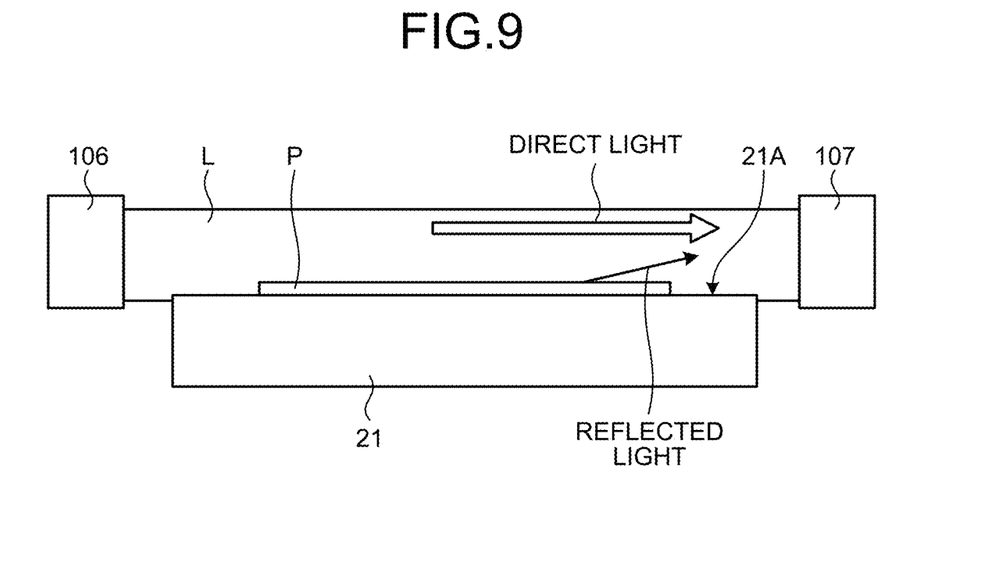
FIG. 9 is a front view illustrating one example when erroneous detection of a lift of a medium occurs in the abnormality detecting device.
Figure 10:
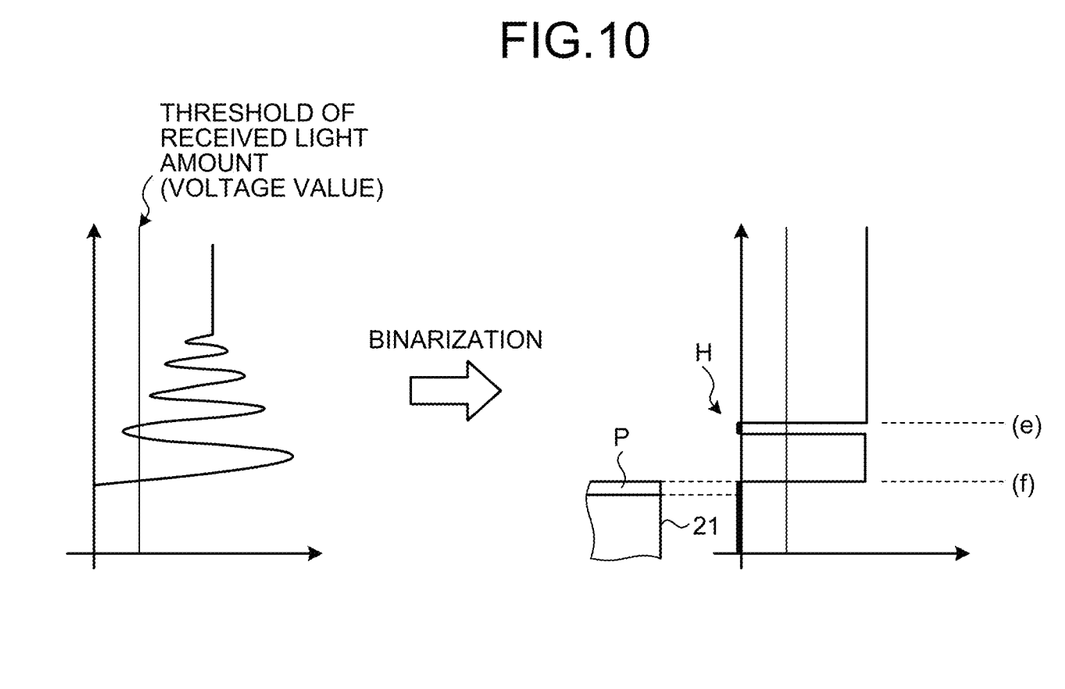
FIG. 10 is a diagram illustrating one example of a waveform output when a direct light interferes with a reflected light in the abnormality detecting device.

Herein, the light emitter 106 emits a detection beam L toward the light receiver 107. However, actually, not only direct light but also light reflected by the medium P such as a sheet of paper may be generated. If interference between the direct light and the reflected light has occurred, erroneous detection of a lift of the medium P may occur. Referring to FIG. 9 and FIG. 10, the following describes a mechanism by which erroneous detection of a lift of the medium P occurs.

FIG. 9 is a front view illustrating one example of a state in which erroneous detection of a lift of the medium P occurs. When the light emitter 106 has emitted a detection beam L, reflected light may be generated at the medium P, and the erroneous detection of a lift of the medium P may occur as a result of interference between the direct light and the reflected light.

FIG. 10 is a diagram illustrating one example of a waveform output when the direct light interferes with the reflected light. When interference between the direct light and the reflected light has occurred, a waveform output by the light receiver 107 changes to a state as illustrated in the left of FIG. 10. Consequently, the received light amount of a light-receiving element that is actually at a position higher than the position where the medium P is present may decrease to or below the first threshold.

In this case, the highest position H in light-receiving elements for which the first determining unit 112 has determined that blocking occurs corresponds to a position (e). Thus, in spite of the fact that the medium P is not present actually there, the abnormality detecting device 10 may detect, as a lift of the medium P, the position (e) that is higher than the highest position (f) in the area where laser rays 1 are actually blocked by the medium P. This is the mechanism by which erroneous detection of a lift of the medium P occurs.

Figure 11A:
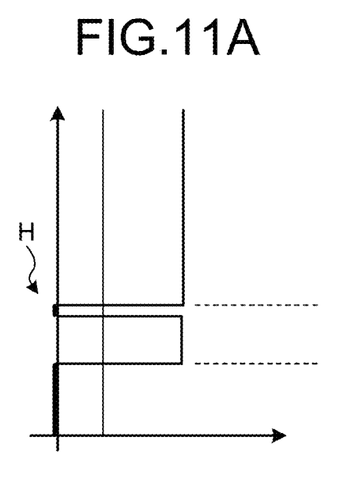
FIGS. 11A and 11B are diagrams illustrating one example of a process in which the abnormality detecting device removes erroneous detection of a medium.
Figure 11B:
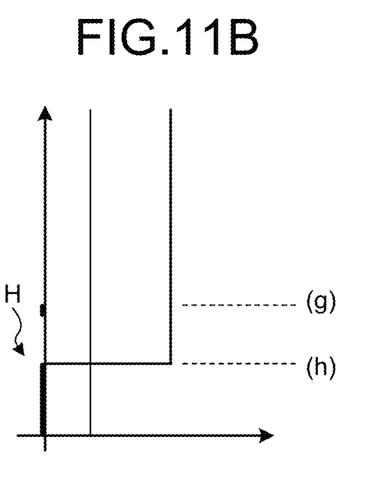

With the abnormality detecting device 10 according to the present embodiment, the lift of the medium P can be accurately detected by removing the above-described erroneous detection. Referring to FIGS. 11A and 11B, the following specifically describes removal of the erroneous detection due to interference between direct light and reflected light.

FIGS. 11A and 11B are diagrams illustrating one example of a process in which the abnormality detecting device 10 according to the present embodiment removes the erroneous detection of the medium P. As illustrated in FIG. 11A, the abnormality detecting device 10 according to the present embodiment basically detects, as a lift of the medium P, the height of a light-receiving element that is at the highest position H among light-receiving elements for which the first determining unit 112 has determined that blocking occurs.

However, as described above, due to the interference between direct light and reflected light, the abnormality detecting device 10 may erroneously detect the medium P. In view of this, the second determining unit 114 determines that no medium is present in an area smaller than an area that is supposed to be blocked by the medium P. When the second determining unit 114 has determined that the medium P is not present, the erroneous-detection removal unit 115 excludes light-receiving elements for which the second determining unit 114 has determined that no medium is present from targets to be detected by the detecting unit 113.

As illustrated in FIG. 11B, when light-receiving elements at the position (g) have been excluded by the erroneous-detection removal unit 115 from the targets to be detected, the position (g) is not considered to be the highest position H in light-receiving elements for which the first determining unit 112 has determined that blocking occurs. Consequently, the position (h) is the position H, and thus the abnormality detecting device 10 can detect the position (h) indicating the actual lift of the medium P as the lift of the medium P.

Herein, in order to determine whether the area that have been determined, by the first determining unit 112, to be blocked is smaller than the area that are supposed to be blocked by the medium P, the second determining unit 114 determines whether the number of light-receiving elements that indicate received light amounts not exceeding the first threshold and are arranged successively in the thickness direction of the medium P exceeds the second threshold.

Herein, the second threshold is a threshold for the second determining unit 114 to determine whether the medium P is present. The second threshold is set to a value with which whether the area is smaller than the area that are supposed to be blocked by the medium P can be determined in consideration of the thickness and bending, for example, of a medium P to be used. The second threshold can be optionally changed depending on a medium P to be used, for example.

Even when the first determining unit 112 has determined that blocking occurs, if the number of light-receiving elements that indicate received light amounts not exceeding the first threshold and are arranged successively in the thickness direction of the medium P does not exceed the second threshold, the second determining unit 114 determines that the medium P is not present in the positions of the light-receiving elements.

In this case, the erroneous-detection removal unit 115 excludes the light-receiving elements from the targets to be detected by the detecting unit 113. This prevents the height of the light-receiving elements from being detected as a lift of the medium P by the detecting unit 113, and thus the abnormality detecting device 10 according to the present embodiment can remove erroneous detection of a lift of the medium P due to interference between direct light and reflected light.

The following describes abnormality detecting operation of the abnormality detecting device 10 according to the present embodiment, including the above-described removal of erroneous detection of a lift of the medium P.

Figure 12:
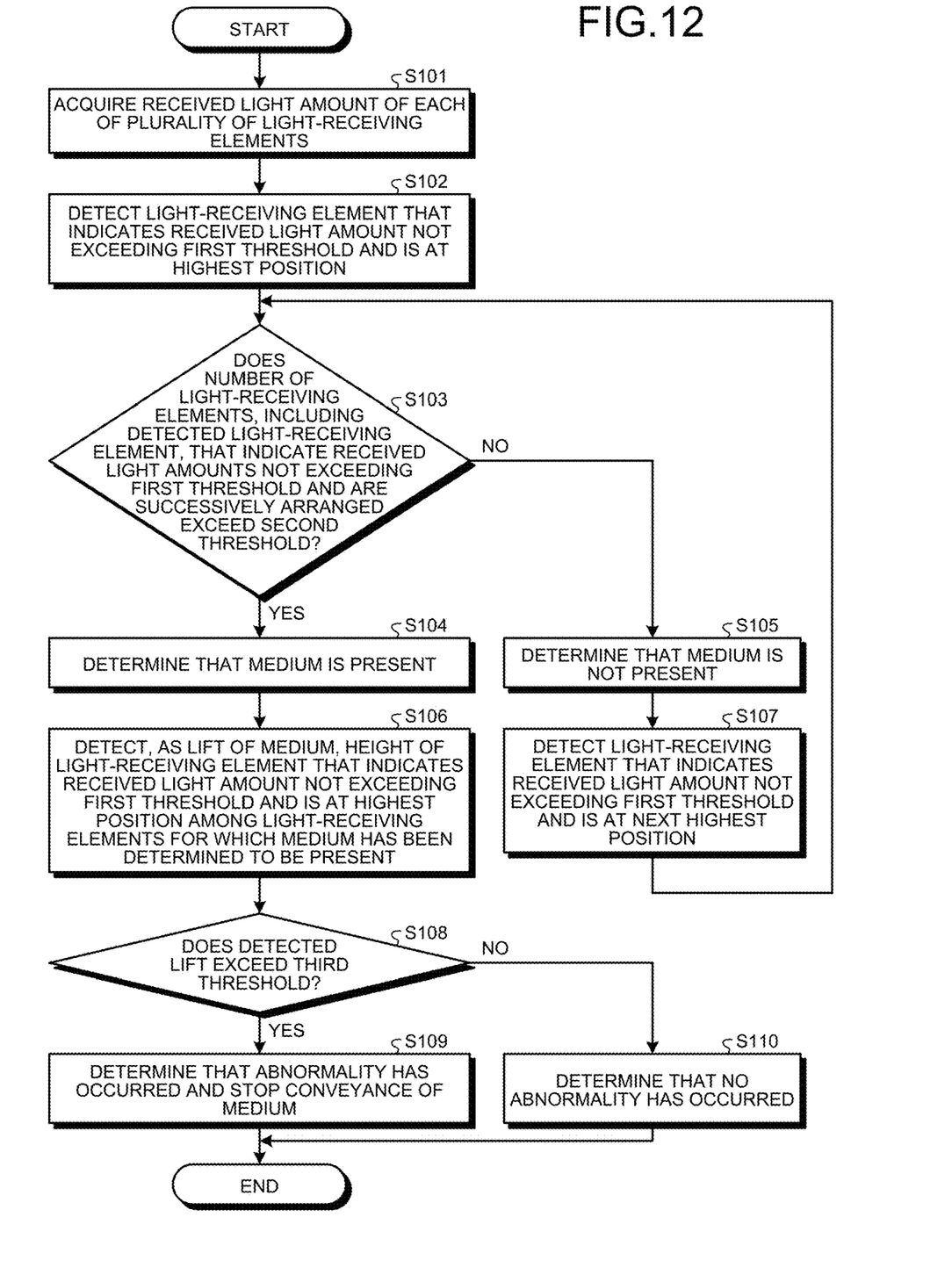
FIG. 12 is a flowchart illustrating one example of operation of the abnormality detecting device.

FIG. 12 is a flowchart illustrating one example of the abnormality detecting operation of the abnormality detecting device 10.

The acquisition unit 111 acquires the received light amount of each of the plurality of light-receiving elements output as a voltage value to the CPU 101 by the light receiver 107 (step S101).

The first determining unit 112 determines whether each of the plurality of light-receiving elements indicates a received light amount not exceeding the first threshold on the basis of the received light amount acquired by the acquisition unit 111. The detecting unit 113 detects a light-receiving element that is at the highest position among light-receiving elements for which the first determining unit 112 has determined that the received light amounts do not exceed the first threshold (step S102).

The second determining unit 114 determines whether the number of light-receiving elements, including the light-receiving element detected by the detecting unit 113 at step S102 or step S107 described later, that indicate received light amounts not exceeding the first threshold and are arranged successively in the thickness direction of the medium P exceeds the second threshold (step S103).

If the number of the light-receiving elements arranged successively in the thickness direction of the medium P exceeds the second threshold (Yes at step S103), the second determining unit 114 determines that the medium P is present (step S104). In this case, the detecting unit 113 determines, as a lift of the medium P, the height of a light-receiving element that indicates a received light amount not exceeding the first threshold and is at the highest position among light-receiving elements for which the second determining unit 114 has determined that the medium P is present (step S106).

The third determining unit 116 determines whether the lift of the medium P detected by the detecting unit 113 exceeds the third threshold (step S108).

If the lift exceeds the third threshold (Yes at step S108), the third determining unit 116 determines that abnormality has occurred. In this case, the conveyance control unit 117 stops conveyance of the medium P, and ends this processing (step S109).

If the lift does not exceed the third threshold (No at step S108), the third determining unit 116 determines that no abnormality has occurred, and ends this operation (step S110).

At step S103, if the number of the light-receiving elements arranged successively in the thickness direction of the medium P does not exceed the second threshold (No at step S103), the second determining unit 114 determines that the medium P is not present (step S105). In this case, the erroneous-detection removal unit 115 excludes, from targets to be detected by the detecting unit 113, light-receiving elements that are at positions where the second determining unit 114 has determined that no medium is present.

The detecting unit 113 detects a light-receiving element that indicates a received light amount not exceeding the first threshold and is at the next highest position except the light-receiving elements that the erroneous-detection removal unit 115 has excluded from the targets to be detected (step S107).

The detecting unit 113 then repeats step S103, step S105, and step S107 until the second determining unit 114 determines at step S103 that the medium P is present. If the second determining unit 114 has determined that the medium P is present, processes described above are performed, and thus description thereof is omitted.

Effects of Abnormality Detecting Device According to Present Embodiment

The detecting unit 113 of the abnormality detecting device 10 according to the present embodiment detects a lift of the medium P if the number of, among the plurality of light-receiving elements, light-receiving elements that indicate received light amounts not exceeding the first threshold and are arranged successively in the thickness direction of the medium P exceeds the second threshold. Furthermore, in a case where the number of, among the plurality of light-receiving elements, light-receiving elements that indicate received light amounts not exceeding the first threshold and are arranged successively in the thickness direction of the medium P does not exceed the second threshold, the erroneous-detection removal unit 115 considers this case as erroneous detection and prevents the detecting unit 113 from detecting a lift of the medium P.

In other words, even when light-receiving elements indicate received light amounts not exceeding the first threshold due to interference in a detection beam L, if the number of, among these light-receiving elements, light-receiving elements that are arranged successively in the thickness direction of the medium P does not exceed the second threshold, the abnormality detecting device 10 according to the present embodiment considers that an area determined to be blocked is smaller than an area supposed to be blocked by the medium P, and can remove this area as erroneous detection.

Thus, the abnormality detecting device 10 according to the present embodiment provides an advantageous effect of being able to accurately detect a lift of the medium P such as a sheet of paper by removing possible erroneous detection of a lift of the medium P due to interference caused by reflection of a detection beam L on the medium P.

Although an embodiment of the present invention has been described above, this embodiment has been presented by way of example only, and is not intended to limit the scope of the invention. The present invention is not limited to the embodiment exactly as presented, and components thereof may be modified to be embodied without departing from the gist thereof in an implementation phase. Furthermore, various inventions can be made by appropriately combining a plurality of components disclosed in the embodiment. For example, from all the components described in the embodiment, some components may be omitted.

Modification

The embodiment has been described in which the second determining unit 114 determines that the medium P is present if the number of light-receiving elements that indicate received light amounts not exceeding the first threshold and are arranged successively in the thickness direction of the medium P exceeds the second threshold, and the detecting unit 113 detects, as a lift of the medium F, the height of a light-receiving element that is at the highest position among light-receiving elements for which the second determining unit 114 has determined that the medium P is present.

However, the detecting unit 113 may detect, as a lift of the medium P, the height of a light-receiving element that indicates a received light amount exceeding the first threshold and is at the lowest position.

Figure 13:
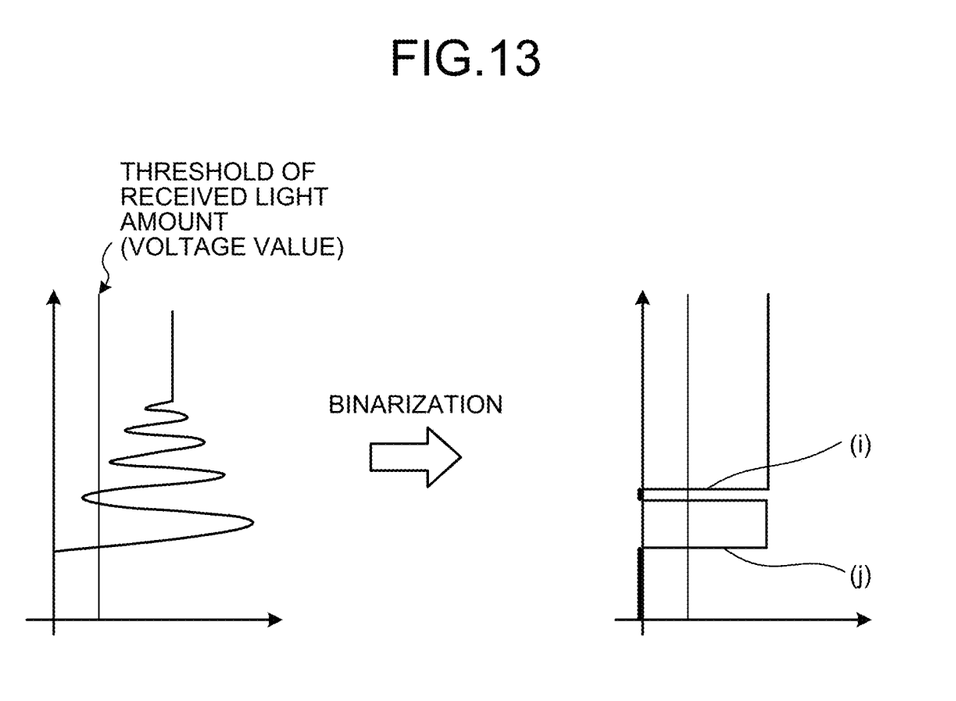
FIG. 13 is a diagram illustrating one example of a process of an abnormality detecting device according to a modification.

FIG. 13 is a diagram illustrating one example of an abnormality detecting process according to a modification of the present embodiment. In this modification, the detecting unit 113 detects, as a lift of the medium P, the height (j) of a light-receiving element that indicates a received light amount exceeding the first threshold and is at the lowest position. Thus, even when, above the position of this light-receiving element, there is a light-receiving element that indicates a received light amount not exceeding the first threshold, the height (i) of this light-receiving element that indicates a received light amount not exceeding the first threshold is not detected as a lift of the medium P.

This modification is useful when a situation in which the medium P completely lifts and a space is formed between the medium P and the conveying roller 21 is hardly imagined.

According to the present invention, an effect of enabling the removal of possible erroneous detection of medium lift due to the interference caused by reflection of a laser beam on a medium, for example, can be obtained.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An abnormality detecting device comprising:
a light emitter including a light-emitting element disposed at one side of a conveyed medium, and configured to emit a laser beam having a width in a thickness direction of the medium by the light-emitting element;
a light receiver disposed at the other side of the medium to be opposed to the light emitter across the medium, including a plurality of light-receiving elements arranged in the thickness direction of the medium, and configured to receive, by the plurality of light-receiving elements, the laser beam emitted by the light emitter; and
a detecting unit configured to detect a lift of the medium in a case where a number of light-receiving elements indicating received light amounts not exceeding a first threshold and being arranged successively in the thickness direction among the plurality of light-receiving elements exceeds a second threshold.

2. The abnormality detecting device according to claim 1, wherein the detecting unit is configured to detect, as the lift of the medium, a height of a light-receiving element indicating a received light amount not exceeding the first threshold and being at the highest position among the plurality of light-receiving elements.

3. The abnormality detecting device according to claim 1, further comprising an erroneous-detection removal unit configured to, in a case where a number of light-receiving elements indicating received light amounts not exceeding the first threshold and being arranged successively in the thickness direction among the plurality of light-receiving elements does not exceed the second threshold, consider the case as erroneous detection and do not detect a lift of the medium.

4. The abnormality detecting device according to claim 1, wherein the detecting unit is configured to detect, as the lift of the medium, a height of a light-receiving element indicating a received light amount exceeding the first threshold and being at the lowest position among the plurality of light-receiving elements.

5. The abnormality detecting device according to claim 1, further comprising a conveyance control unit configured to stop conveyance of the medium when the lift of the medium detected by the detecting unit exceeds a third threshold.

6. An image forming device comprising:
an image forming unit configured to form an image on medium;
a conveying unit configured to convey the medium in a sub-scanning direction in which the medium is conveyed and deliver the medium to the image forming unit; and
the abnormality detecting device according to claim 1.

7. An abnormality detecting method comprising:
acquiring a received light amount of a laser ray of each of a plurality of light-receiving elements arranged in a thickness direction of a conveyed medium and being opposed to a light-emitting element across the medium, the light-emitting element being configured to emit the laser ray parallel to a conveying surface of the medium; and detecting a lift of the medium when a number of light-receiving elements indicating received light amounts not exceeding a first threshold and being arranged successively in the thickness direction among the plurality of light-receiving elements exceeds a second threshold.

8. A computer program product comprising a non-transitory computer-readable medium including programmed instructions that cause a computer configured to control an abnormality detecting device, to execute:

acquiring a received light amount of a laser ray of each of a plurality of light-receiving elements arranged in a thickness direction of a conveyed medium and being opposed to a light-emitting element across the medium, the light-emitting element being configured to emit the laser ray parallel to a conveying surface of the medium; and detecting a lift of the medium when a number of light-receiving elements indicating received light amounts not exceeding a first threshold and being arranged successively in the thickness direction among the plurality of light receiving elements exceeds a second threshold.

* * * * *